United States Patent
Nossek et al.

(10) Patent No.: US 11,108,970 B2
(45) Date of Patent: Aug. 31, 2021

(54) FLICKER MITIGATION VIA IMAGE SIGNAL PROCESSING

(71) Applicant: SAMSUNG ELECTRONICS CO., LTD., Suwon-si (KR)

(72) Inventors: Raz Zvi Nossek, Tel Aviv (IL); Assaf Tzabari, Tel Aviv (IL); Doron Sabo, Petah-Tikva (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 16/504,788

(22) Filed: Jul. 8, 2019

(65) Prior Publication Data

US 2021/0014402 A1 Jan. 14, 2021

(51) Int. Cl.
*H04N 5/235* (2006.01)
*H04N 5/353* (2011.01)

(52) U.S. Cl.
CPC ......... *H04N 5/2357* (2013.01); *H04N 5/2351* (2013.01); *H04N 5/2353* (2013.01); *H04N 5/353* (2013.01)

(58) Field of Classification Search
CPC .. H04N 5/3591; H04N 5/2351; H04N 5/2353; H04N 5/2355; H04N 5/2357; H04N 5/353; H04N 5/3535; H04N 5/35554; H04N 5/3559; H04N 5/37452; H04N 5/37457; H01L 27/14609; H01L 27/14641; H01L 27/14643; H01L 27/14654

See application file for complete search history.

(56) References Cited

U.S. PATENT DOCUMENTS

| | | | | |
|---|---|---|---|---|
| 9,679,207 B2* | 6/2017 | Oki | ......................... | G06K 9/209 |
| 10,136,084 B1* | 11/2018 | Solheim | ............... | H04N 5/3535 |
| 10,964,262 B1* | 3/2021 | Lin | ........................ | G09G 3/2022 |
| 2009/0309972 A1* | 12/2009 | Tonokawa | ............ | G07C 5/0866 |
| | | | | 348/148 |
| 2011/0317028 A1* | 12/2011 | Shinmei | ................. | H04N 9/735 |
| | | | | 348/223.1 |
| 2015/0207975 A1* | 7/2015 | Nguyen | ............... | H04N 5/2357 |
| | | | | 348/228.1 |
| 2017/0134634 A1* | 5/2017 | Jin | ........................ | H04N 5/2353 |
| 2021/0014402 A1* | 1/2021 | Nossek | .................. | H04N 5/353 |

* cited by examiner

*Primary Examiner* — Antoinette T Spinks
(74) *Attorney, Agent, or Firm* — F. Chau & Associates, LLC (57) ABSTRACT

Disclosed is an image processing method employing a post processing technique that may eliminate flicker artifacts from captured video in real time. An example method involves receiving from an image sensor a sequence of input frames representing a scene and identifying and tracking a light source represented within the input frames. Flickering of the light source may be identified by detecting frame to frame color characteristic variation of a region representing the light source. A sequence of output frames may be generated with the flickering removed by selectively modifying image data of pixels within the region.

15 Claims, 11 Drawing Sheets

FLICKER MITIGATION VIA IMAGE SIGNAL PROCESSING

TECHNICAL FIELD

The present disclosure relates generally to image capture and processing and more particularly to mitigation of light source flicker in video streams.

DISCUSSION OF THE RELATED ART

Light Emitting Diodes (LEDs) and fluorescents are examples of light sources that illuminate a scene with a flicker, typically with a frequency in the range of 50 Hz-2 KHz. A video camera's frame capture rate may not be synchronized with the flicker frequency, and a camera's exposure windows may be too short to avoid frame to frame luminance variation due to the flicker. Thus, the resulting captured video may exhibit a noticeable flicker artifact when displayed. Further, in some applications the video is fed to an external system that responds to the video information, such as an Advanced Driver Assistance System (ADAS). In these cases, light sources like a car's taillights will appear nearly off in frames captured around flicker-induced luminance nulls, which may result in an imperfect response by the system.

Prior art attempts to address flickering may be classified into solutions in the sensor domain or the image merger domain. Solutions in the sensor domain try to change the method by which the sensor collects information from the scene. One approach attempts to adjust/change frame exposure methods to avoid frame to frame variations in average captured luminance. A second approach attempts to modify the sensor elements themselves to provide flicker-insensitive data.

The image merger is a mechanism used in image sensors to produce a high dynamic range image. It produces a single image merged from data of several images (typically two to four) created with different exposures and each having less bit depth than the final image. Solutions in the image merger domain try to adapt the different exposure times according to flicker-biased data from the scene, and perform different merging methods accordingly.

SUMMARY

Embodiments of the inventive concept utilize a post-processing solution to mitigate flickering artifacts in real time captured video, using an image signal processor to selectively correct values of pixel data representing a flickering light source.

In an aspect, an image processing method involves receiving from an image sensor a sequence of input frames representing a scene, identifying a light source represented within the input frames, and tracking the identified light source between consecutive input frames. Flickering of the light source is identified by detecting frame to frame color characteristic variation of a region representing the light source. A sequence of output frames corresponding to the input frames is generated, with the flickering removed by selectively modifying image data of pixels within the region.

In an example, color characteristic variation associated with flickering is identified by a frame to frame change in at least one color space region of the light source, where the change satisfies at least one predefined criterion. The at least one color space region may include a Hue Saturation Value (HSV) color space region.

In an aspect, an image processing method involves receiving from an image sensor a current frame and at least one previous frame representing respective images of a scene. Flickering light source suspects (FSSs) are identified within the current frame, and bounding boxes surrounding the respective FSSs are generated. The bounding boxes are tracked between consecutive frames and their positions and sizes are updated based on the tracking. Segmentation of each tracked bounding box is performed. Flickering of an FSS is detected and image data of pixels representing the same are selectively modified to mitigate the flickering.

In another aspect, an apparatus comprises a camera that performs flicker mitigation. The camera includes an image sensor configured to capture images of a scene and provide input frames representing the same; and an image signal processor configured to execute instructions to implement either of the image processing methods summarized above in respective embodiments.

In an example, the apparatus may be a vehicle.

In still another aspect, a non-transitory computer-readable recording medium stores instructions that, when executed by an image signal processor, implement either of the image processing methods summarized above in respective embodiments.

BRIEF DESCRIPTION OF THE DRAWINGS

The above and other aspects and features of the inventive concept will become more apparent from the following detailed description, taken in conjunction with the accompanying drawings in which like reference characters indicate like elements, features or operations, wherein.

DETAILED DESCRIPTION OF EMBODIMENTS

The following description, with reference to the accompanying drawings, is provided to assist in a comprehensive understanding of certain exemplary embodiments of the inventive concept disclosed herein for illustrative purposes.

The description includes various specific details to assist a person of ordinary skill in the art with understanding the inventive concept, but these details are to be regarded as merely illustrative. For the purposes of simplicity and clarity, descriptions of well-known functions and constructions may be omitted when their inclusion may obscure appreciation of the inventive concept by a person of ordinary skill in the art.

Embodiments of the inventive concept described hereafter focus on a different type of solution than the sensor domain and image merger domain solutions of the conventional art. That is, the inventive concept is based on a different approach to data handling: a post-processing solution in which an image signal processor (ISP) based system corrects the produced image. While the conventional methods try to change the way data is acquired from the scene, the inventive concept works on faulty data received from the image sensor and corrects it, thus making it more suitable to a variety of sensors and allowing for a higher degree of flexibility.

Embodiments described hereafter compensate for unwanted flickering in video sequences generated inherently by flickering light sources ("FLSs") such as LEDs. In various embodiments, the flickering is locally corrected within regions identified as FLSs, but not outside those regions. Thus, only a small fraction of the pixels within an image frame may be selected for correction. It is assumed that while an FLS is ON, it is brighter than when OFF and the difference is significant. Intentional flickering of a light source, i.e. blinking such as for pedestrian lights or vehicle signaling lights can be distinguished by having a lower flickering frequency.

In the following description, in the context of an image sensor pixel, "luminance of a pixel" or like term refers to luminance represented by image data of the pixel, where the luminance is that of a region in a captured scene corresponding to that pixel.

Figure 1:
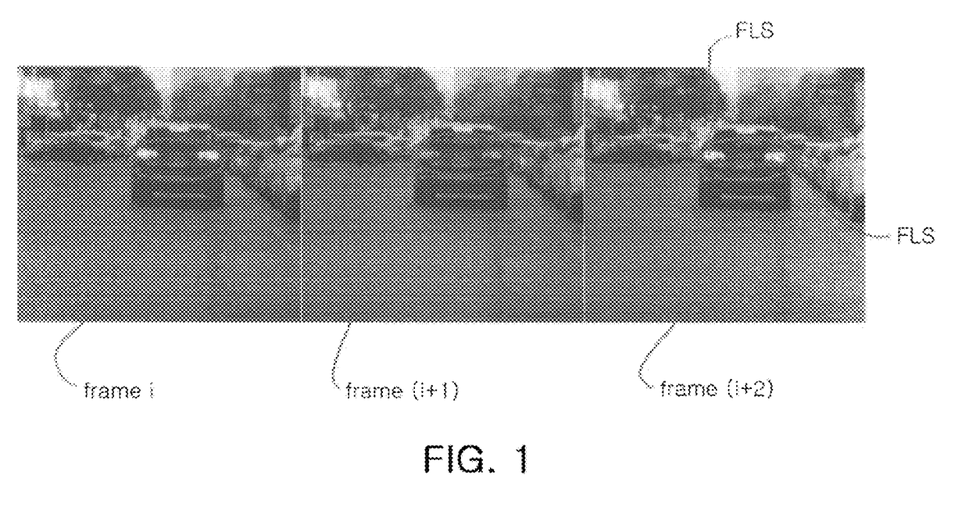
FIG. 1 illustrates an example video sequence of three consecutive frames of a scene with a flickering light source.

FIG. 1 illustrates an example sequence of three consecutive frames of a captured video sequence suffering from a FLS flicker effect. A camera system captures a scene including a vehicle with illuminated taillights. It is seen that the luminance of the taillights in frame (i+1) is significantly lower than that in frames i and (i+2). A sudden luminance reduction and re-appearance over the course of at least three frames should be recognized as being due to FLS illuminance variation, not to an external cause like a sudden shadow or on-off action of the car's brakes. In embodiments described hereafter, the luminance of pixels representing light sources in frames such as frame (i+1) may be increased to the level of the bright frames, and/or color characteristics of light source segments may be matched between frames, whereby the flicker is no longer observable by the user viewing a display, or by an external ADAS system or the like responding to the light sources. Once an FLS is identified, embodiments may perform the correction substantially in real time, e.g., with a frame delay due to post-processing of only a few frames or even less than a single frame.

Figure 2:
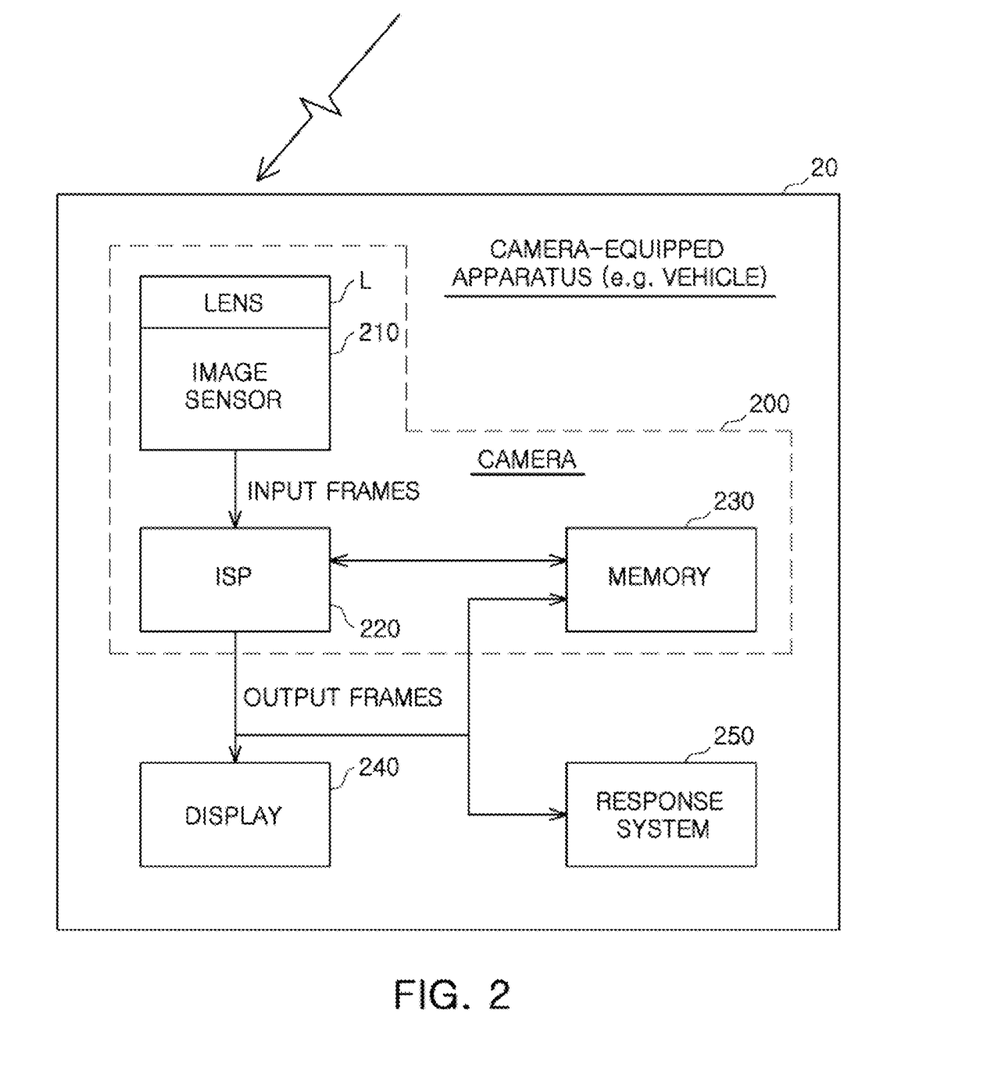
FIG. 2 is a block diagram illustrating example components of a camera-equipped apparatus in accordance with an embodiment of the inventive concept.

FIG. 2 is a block diagram illustrating example components of a camera-equipped apparatus, 20, in accordance with an embodiment of the inventive concept. Camera-equipped apparatus 20 may be any apparatus that benefits from flickering mitigation in captured video. One example is a vehicle equipped with an ADAS or autonomous driving system that responds to captured video surrounding the vehicle, where an uncorrected FLS in the video may result in performance degradation. An example vehicle may additionally or alternatively include an In-Vehicle-Infotainment (IVI) system that captures video and displays the same on a display. Other examples include a stand-alone camera or a smartphone or the like in which the user views a real time display that would otherwise produce a flickering artifact due to FLSs in a scene. Still other examples include robots, medical imaging devices, security systems, and so forth.

Apparatus 20 includes a camera 200 which in turn comprises an image sensor 210, a lens L, an image signal processor (ISP) 220, and a memory 230. Apparatus 20 may further include a display 240 (which in some examples is part of camera 200) and a response system 250. Image sensor 210 may be a CCD or CMOS sensor or the like that captures images through lens L in exposure windows at a predetermined frame rate. Data representing charge collected in the pixels of image sensor 210 may be read out as input frames to ISP 220 in any conventional manner. ISP 220 may cooperate with memory 230 to process the input frames conventionally and also for flicker mitigation discussed hereafter. ISP 220 thereby provides output frames, corresponding to the input frames, with pixel data corrected in local regions representing the FLSs. Memory 230 may store instructions read and executed by ISP 220 to execute the processing operations described herein. Memory 230 may also store interim results of calculations, frame data for the calculations, and the output frames for later retrieval if desired. Depending on the particular application, the output frames may be output as video to display 240 and/or to response system 250. Display 240 displays the output frames with flicker artifacts mitigated. Response system 250 causes an appropriate response to the video, such as collision avoidance if apparatus 20 is a vehicle.

Figure 3:
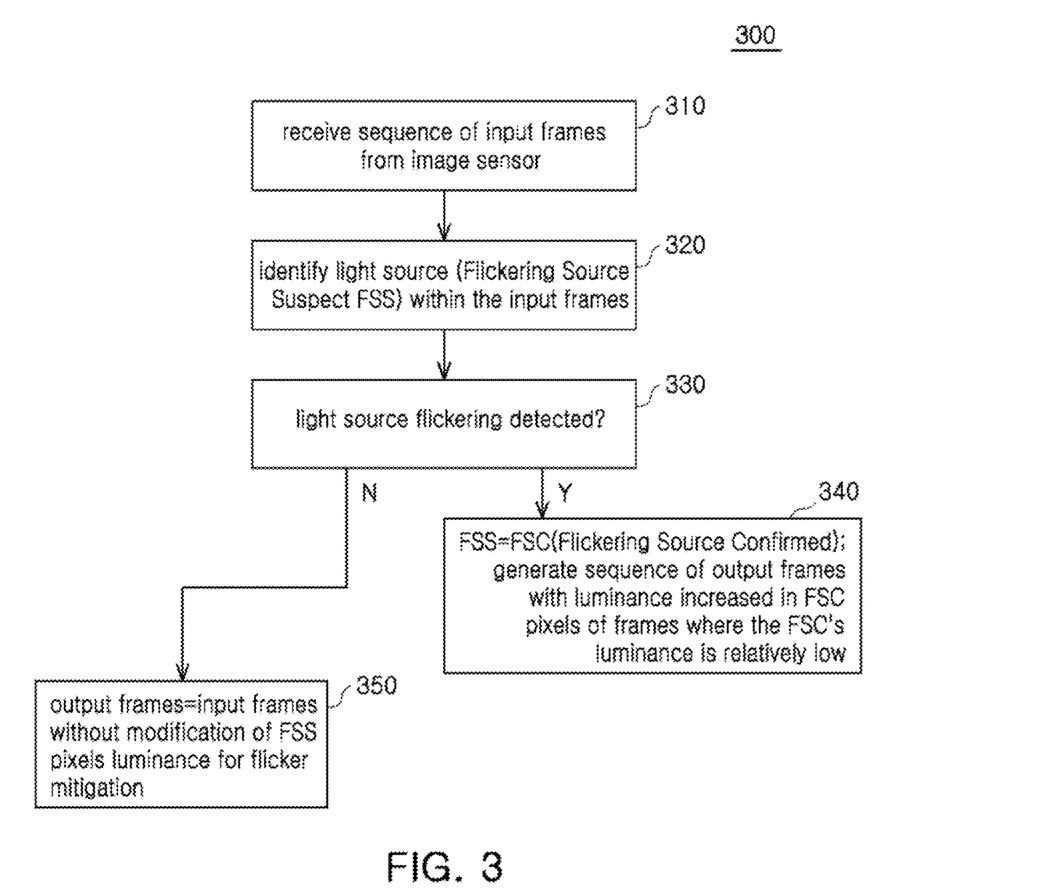
FIG. 3 is a flowchart of an example image processing method for flicker mitigation in accordance with an embodiment.
Figure 4:
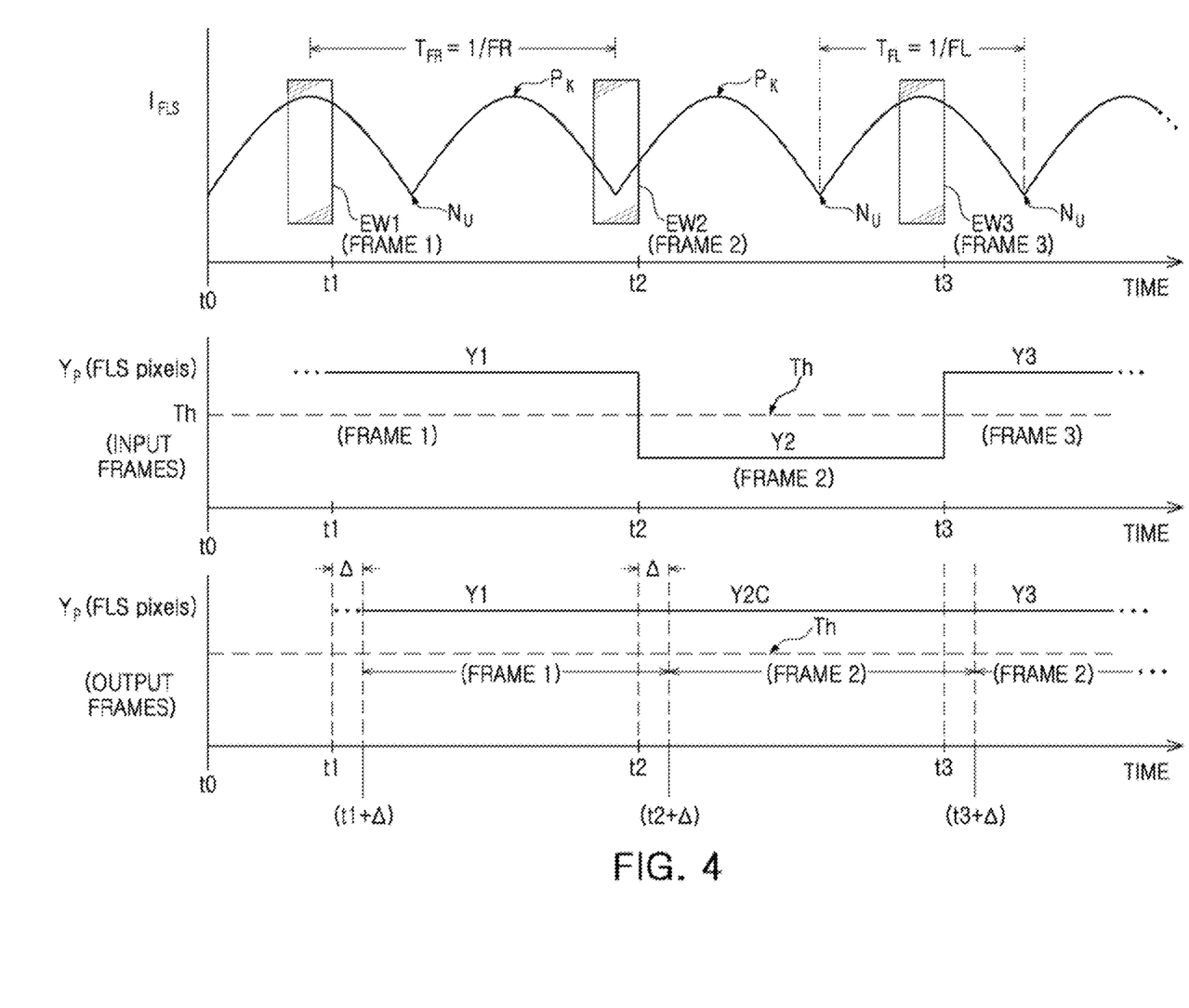
FIG. 4 is a timing diagram depicting examples of light intensity of a flickering light source, and brightness of pixels in each of input and output frames.

FIG. 3 is a flow chart illustrating an example image processing method, 300, for flicker mitigation in accordance with an embodiment. The operations of method 300 may be performed by ISP 220. FIG. 4 is a timing diagram depicting examples of light intensity of a flickering light source, and luminance of pixels in each of input and output frames, to illustrate concepts of method 300. Referring collectively to FIGS. 3 and 4, a sequence of input frames is received (operation 310) from image sensor 210 at a predetermined frame rate. For instance, FIG. 4 gives an example in which a light source intensity $I_{FLS}$ of a flickering light source (FLS) has a flicker frequency FL that differs from a frame rate FR. The intensity $I_{FLS}$ periodically varies between a sequence of peaks $P_K$ (and also between a sequence of nulls $N_U$) at a period $T_{FL}=1/FL$. The waveform characteristics of the periodic intensity variation depends on the light source. For instance, a rectified sine wave type waveform is illustrated but in other examples, the waveform may resemble a pulse width modulation (PWM) shape. In any case, image sensor 210 may have an electronic or mechanical shutter controlled by a controller (not shown) of camera 200 to capture and measure light in periodic exposure windows EW1, EW2, EW3 . . . of uniform durations, to generate a sequence of input frames Frame 1, Frame 2, Frame 3 . . . . Since the exposure windows each have a duration shorter than the flicker period $T_{FL}$, the luminance of pixels within the FLS may be non-uniform from frame to frame due to the flicker. Other color characteristics may vary in the FLS region from frame to frame due to the flicker. For instance, if the composite color of a pixel (composed of R, G and B subpixels) in the FLS region is represented in HSV space (HSV=Hue Saturation Value), color characteristics may change not only in the V channel (which may approximately represent luminance) but also in the H and/or S channels.

ISP 220 may initially identify a light source within a given input frame of the sequence, e.g. by using a clustering algorithm to detect a cluster of pixels in which most or all pixels have a luminance higher than a threshold Th; and ISP 220 may track the light source from frame to frame (320). Threshold Th may be determined for each frame independently, depending on frame statistics, such that the threshold Th is time dependent. In an example, threshold Th may have been determined as a luminance level higher than an average luminance of the pixels in the entire frame by more than a certain percentage or fixed value (where an average is but one example of a frame statistic). Other factors, such as the shape and/or size of the cluster, may also be considered in the initial determination as to whether the cluster is relevant for further consideration as a possible FLS. A possible FLS, hereafter referred to as a flickering light source suspect (FSS), may be subsequently corrected for flicker mitigation.

Once an FSS is initially identified in a single frame (or alternatively over two or more consecutive frames using motion estimation to realize a higher level of confidence), the method detects whether the FSS is a flickering light source (FLS) (330). This determination may involve an analysis of luminance levels and optionally other color characteristics in the cluster of pixels for as few as two consecutive frames, where the number of consecutive frames may be selected depending on a confidence level. For example, FIG. 4 illustrates flicker determination and correction by comparison to a threshold Th that's based just on luminance levels Yp of pixels. Frame 1 in FIG. 4 is shown to be captured during exposure window EW1 which is centered near a peak $P_K$ of the intensity waveform of a flickering light source FLS. Since frame 1 is captured during a high intensity portion of the intensity waveform, the average luminance Yp of a cluster of pixels representing the FSS in frame 1 may be Yp~Y1, above threshold Th. (For simplicity of explanation, threshold Th is shown to be the same from frame to frame; however, as noted above, threshold Th may vary from frame to frame based on frame statistics.) However, frame 2 is captured during exposure window EW2 which encompasses a null $N_U$ of the intensity waveform. Hence, during exposure window EW2 of frame 2, the average luminance of the FSS pixels is Y2<Th. At this point, the cluster of pixels representing the FSS may be confirmed as an FLS, and may be referred to hereafter as a Flickering Source Confirmed (FSC). It is noted here that one way of analyzing luminance of a pixel and identifying flickering of an FSS is to first convert RGB data to HSV color space. In the HSV representation, if there's a distinctive change in the density of a histogram of the value (V) channel, the FSS may be considered flickering. (Density of a histogram may be understood as a probability distribution; a change in density may be understood as a change in shape of the probability distribution.) When analyzing just two frames, one example approach may take a risk that the flicker may be an intentional one such as that of a blinking traffic light. In this case, even though the flicker may be intentional, the frame may be erroneously "corrected". The risk may be taken for a predetermined number of frames, and if analysis of subsequent frame data concludes that the flicker is intentional, no subsequent correction is made for that light source. Part of the reason for taking such a "calculated risk" is that an aliasing problem may exist, caused by the camera not sampling the scene at a high enough rate, i.e., the frames per second (FPS) is low.

Detecting frame to frame color characteristic variation to identify flickering may include identifying a frame to frame change in volume location of the light source within at least one color space, where the change satisfies at least one predefined criterion. Note that the pixels representing the light source may respectively have slightly different color characteristics in any given frame, and therefore collectively occupy a small volume in color space for each frame. In one example, the at least one color space is a single color space, e.g., HSV. In another example, the at least one color space is a combination of HSV and YUV color spaces (discussed below).

In the FIG. 4 example, exposure window EW3 of frame 3 is near another peak $P_K$, whereby an average luminance Y3 of the FSS pixels is above the threshold Th. This detection may confirm that the FSC is due to an inherent flicker rather than an intentional flicker. Alternatively, detection of inherent FLS flickering is distinguishable from intentional flickering by detecting a different color change characteristic over just two frames. For instance, an "expected" histogram may be built using history data and then data from a current frame may be compared to the history data; analysis of the current frame data relative to the expected histogram may result in immediate detection of an inherent flicker or an intentional flicker.

Note that the times t1, t2 and t3 denote the ends of the respective exposure periods EW1, EW2 and EW3, and data read-out from the image sensor 210 may begin at these times. (If a rolling shutter is used, data read-out of some lines in the frames may begin during the exposure periods.) Accordingly, the FSS may be confirmed as an FSC at a time shortly after time t2, but prior to a time (t2+Δ) reflecting additional processing for correction, discussed below It is also noted that in the above discussion, for simplicity of understanding, the threshold Th was assumed to be the same for each frame. However, in other examples the threshold may change dynamically from frame to frame, such as when the threshold is based on an average luminance of the frame. Average luminance of the frame may change significantly from one frame to the next depending on circumstances.

If flickering of the light source is detected (FSS=FSC), the flow proceeds to operation 340 where the ISP 220 may generate a sequence of output frames with color characteristics of FSS pixels corrected. In a relatively simplistic example, color characteristics are corrected by increasing luminance in FSC pixels of frames where the FSC's average luminance is below the threshold Th, referred to hereafter as "low level frames". For instance, FIG. 4 shows that input frame 2 is a low level frame, whereby the method increases the luminance Yp of the FLS pixels in the corresponding output frame 2 to a corrected level Y2*c* above threshold Th. In this example, correction could be made to the low level frame as soon as flicker is detected, which may be shortly after time t2 (or slightly sooner if the image sensor uses a rolling shutter and the FSS is within a region of an early line read-out). Output frames may be generated after an additional processing time Δ for correction, if needed. Thus, while input frames 1, 2 and 3 are received by ISP 220 at times t1, t2 and t3, respectively, output frames 1, 2 and 3 may be output to display 240 and/or response system 250 beginning at respective times (t1+Δ), (t2+Δ) and (t3+Δ), where Δ may be less than one frame, a typical metric for real time video.

In an alternative embodiment, if the above-noted "calculated risk" of erroneously correcting an intentional flicker is not taken, one or more initially detected low level frames may be outputted as is, i.e., without correction. In the case of the output frames being displayed as real time video, the display of just a few low level frames may not be noticeable to the user. In this embodiment, once the system determines that an FSC is present in a number of initial frames in which an FSS is newly detected, a subsequent low level frame may be corrected as soon as it is detected, potentially reducing latency. For instance, in FIG. 4, suppose the FSC is detected based on a sequence of frames just prior to input frame 1. Then, output frame 1 may be output beginning at time (t1+Δ), where Δ is an intentional, short delay less than $T_{FR}$. Next, just after time t2 the FSC pixel data is read again and the average level Y2<Th is determined, whereby input frame 2 is immediately recognized as a low level frame based on the history of frames just prior to input frame 1. ISP 220 may then immediately correct the pixels shortly after time t2, without waiting for the next input frame 3 to confirm that a flicker actually exists. Accordingly, in this embodiment, although initial low level frames (prior to time t1) are output as is, the delay Δ in subsequent frames may be reduced.

If, in operation 340, no light source flickering is detected, output frames are generated (350) without modification of FSS pixels' image data for flicker mitigation.

Figure 5:
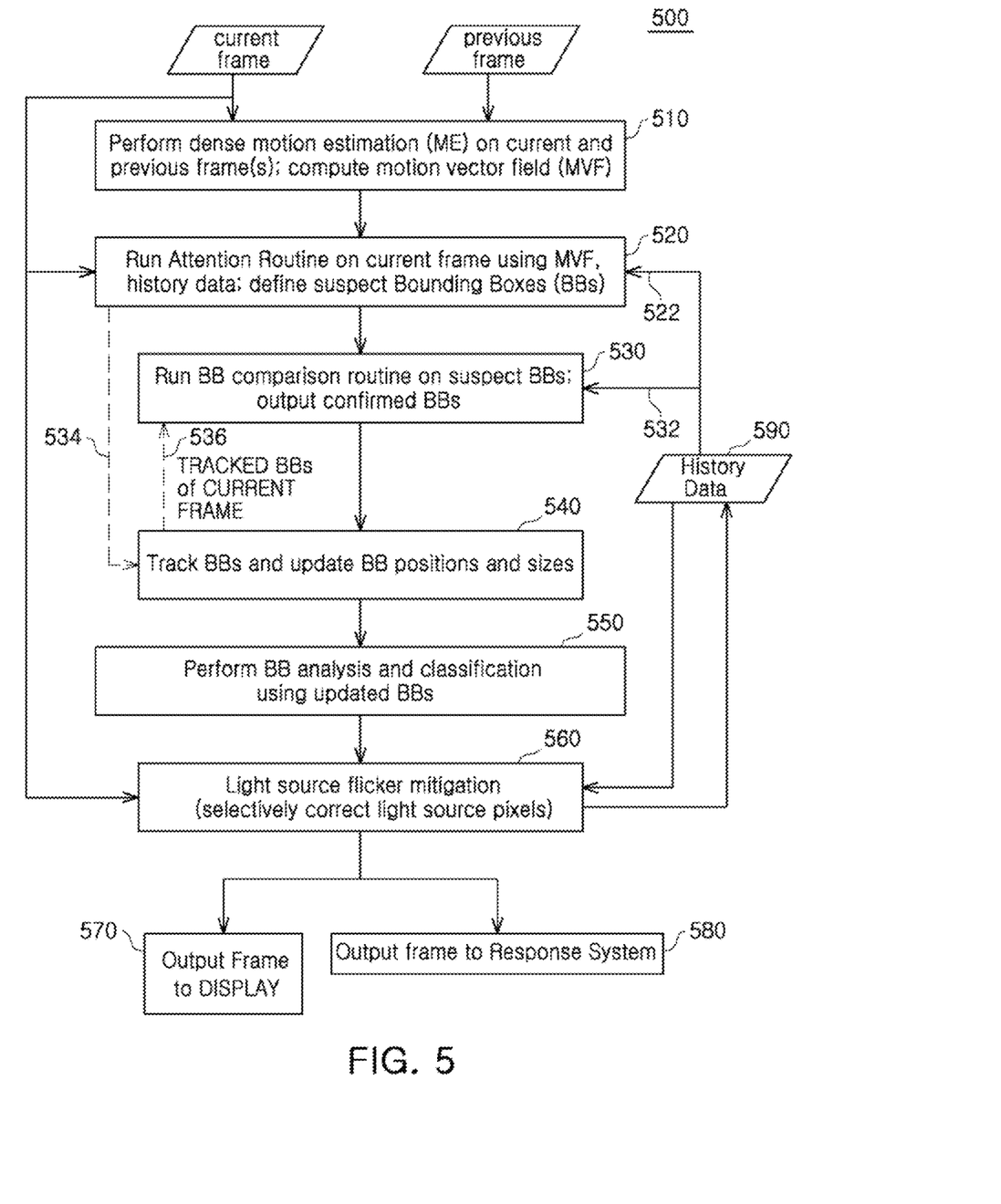
FIG. 5 is a flowchart of an example image processing method for flicker mitigation in accordance with an embodiment.

FIG. 5 is a flow chart illustrating an example image processing method, 500, for flicker mitigation in accordance with an embodiment. Method 500 is an example of method 300 of FIG. 3 and may be performed by ISP 220, which receives input frames from image sensor 210. In method 500, a first operation 510 involves receiving a current frame from image sensor 210 and receiving a previous frame from memory 230 (herein referred to interchangeably as a "history frame"); performing a dense motion estimation (ME) on the current and previous frame(s); and computing a motion vector field (MVF) based on the ME. The previous frame, although shown independently in FIG. 5, may have been stored in a history database 590 within memory 230. In some cases, the motion estimation may utilize data from two or more previous frames stored in history database 590.

Next, an "Attention" routine may be run (520) on the current frame using the motion vector field just computed as well as history data (if any) received from history database 590, the latter indicated by path 522. (As mentioned earlier, although a single frame may be analyzed to identify a new light source, the use of two or more frames with motion estimation between the frames may increase a level of confidence that a cluster of pixels actually represents a light source.) The Attention routine may bring to attention suspected flickering light sources, i.e., flickering source suspects (FSSs) and may also define suspect bounding boxes (BBs) surrounding FSSs. A suspect BB is a BB that includes at least one FSS (and is thus a BB suspected of containing a flickering light source (FLS)). If the current frame and the previous frame are the very first two frames of method 500, e.g., during an initialization process when camera 200 is first turned on, all of the suspect BBs outputted will contain new sources of light that appear for the first time in the sequence of frames. Otherwise, some of the outputted suspect BBs may be "tracked BBs" containing FSSs previously detected and tracked by a tracking routine (discussed below). An example of an Attention routine is discussed later in connection with FIGS. 6-8.

Next, a bounding box comparison routine (also called an "Association" routine) may be run (530) on the suspect BBs output from the Attention routine. The Association routine may use history data (if any) from history database 590 (as indicated by path 532) to compare the suspect BBs defined in the current frame to previous BBs, and drop duplicates. A previous BB is a BB that existed in a recent previous frame, and may be part of the history data. Any suspect BB that is not dropped may be considered a "confirmed BB" (or a "newly discovered BB"), and may be output to the next processing stage along with any other confirmed BBs. If the current frame and the previous frame are the very first two frames of method 500, all the suspect BBs received from operation 520 may be considered confirmed BBs.

For example, the Association routine of operation 530 may receive first and second sets of data. The first set of data is the set of suspect BBs in the current frame. These BBs represent suspect regions of interest found by the Attention routine applied on the current frame. For instance, this set may include new sources of light that appear for the first time in the sequence of frames.

The second set of data is a set of tracked BBs that appear in the current frame. This set may be provided by a "tracker" running in operation 540, as indicated by paths 534 and 536. The second set represents the known sources of light that are found by the tracker in the current frame. In order to merge the two sets, a data association procedure (of operation 530) may heuristically perform matching between the bounding boxes of the first and second sets, and identify new BBs as the confirmed BBs. Any suitable patch-based association module with the input and output noted above may be utilized for the data association procedure. This includes, for example, matching based on the distance between two BBs, where the distance (e.g., an $L^2$ distance, also known as the Euclidean norm) is measured in a selected feature-space.

Operation 540, which may be referred to as a Tracking stage performed by a "tracker", may receive the confirmed BBs, track all BBs (including those of the current frame as discussed above in connection with paths 534, 536) and update BB positions and sizes. For the task of tracking, an input BB may be defined in a specific initial rectangle of pixels (a "BB rectangle"), such as the coordinates of the top left corner of the BB rectangle, and its length and width. The output of the tracker may be the location and size of the matched bounding box in a succeeding frame. The tracking process may track the bounding box's location (in pixel coordinates) and size (width and height in pixels) in the succeeding frames in the sequence. For instance, any suitable patch-based tracking module with the input and output noted above may be utilized for the tracker tasks. This includes, e.g., adaptive tracking models based on correlation filters. (It is noted here that the tracking operation 540 just discussed can also be incorporated within method 300 at operation 320.)

After the tracking procedure, a bounding box analysis, segmentation and classification may then be performed (550) using the updated BB positions and sizes. Here, each BB may be divided internally to connected components using a segmentation scheme that defines segments within each BB. Each segment may then be classified as a light source, a general object, or a background element. (Example methods to implement operation 550 are described below with respect to FIGS. 9-11.) Light source mitigation may then be performed (560) on the segments (already classified as a light source) that suffer from flicker. In this operation, pixel values of a confirmed flickering source may be corrected, to generate a sequence of output frames. This operation may use history data from prior frames and output results for the current frame from/to history database 590. (An example of operation 560 is described below with respect to FIG. 12.) The output frames may then be output (570) to display 240 to be displayed, and/or output to Response System 250 (580) which generates an appropriate response to the images.

Figure 6:
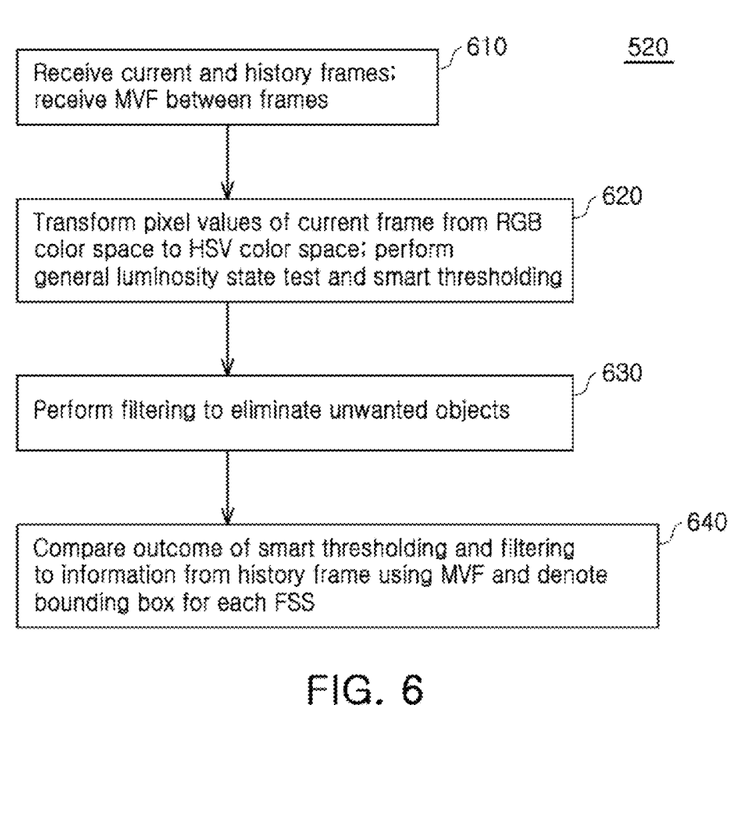
FIG. 6 is a flowchart depicting example operations of an Attention routine in the method of FIG. 5.

FIG. 6 is a flowchart depicting example operations of the Attention routine 520 of method 500. The Attention routine may serve to detect suspect objects as light sources (FSSs) and feed them forward for further inspection to check if flicker mitigation should follow. To this end, a current frame, at least one history frame, and an MVF between these frames may first be received (610). Pixel values of the current frame may then be transformed from Red Green Blue (RGB) color space to Hue Saturation Value (HSV) color space; and a general luminosity state test and adaptive ("smart") thresholding may be performed (620). In the HSV color space, the smart thresholding may be based on the image characteristics for the S and V channels. When performing general thresholding to identify light sources in a frame, and in particular, FSSs—if a V channel value for a given pixel is above a predetermined threshold, above which FSS pixel values normally fall, a first binary value (e.g. "1") may be assigned to that pixel. Otherwise, a second binary value (e.g. "0") may be assigned. A similar assignment scheme may be applied to the S channel. If the pixel's data for the S and V channels are both above the respective thresholds, a high probability may be assigned to that pixel as having characteristics of an FSS pixel. If similar results are obtained for a cluster of pixels in proximity to the given pixel, it may be determined that the cluster of the pixels constitutes an FSS.

The above general approach to thresholding to identify an FSS may be taken a step further in operation 620 by using a smart thresholding approach that takes into account the overall lighting conditions of the frame. A test may be performed on the general luminosity state of the current image (corresponding to the current frame) to check if the image was taken in a well-lit scene or during a dark scene. Different thresholds may be applied depending on the overall lighting conditions. For example, a different significance may be applied to the S channel depending on the outcome of the general luminosity test. Special care may also be taken for very bright objects but with poor saturation. For example, during nighttime hours the Value (V) parameter can be considered much more significant than the saturation, whereby saturation can be ignored.

Once clusters of pixels are identified as possible FSSs based on the thresholding analysis, filtering may be performed (630) to eliminate unwanted objects. The filtering may involve applying the results of operation 620 to a series of digital filters. The objects that remain may be considered FSSs. The outcome of this stage may then be compared to information from the history image using the data from the MVF to confirm the FSSs, and a bounding box may be denoted for each FSS.

It is noted here that the operations of FIG. 6, described as an example operation 520 of method 500, can also be incorporated within operation 320 of method 300, in which an FSS is identified within the input frames.

Figure 7:
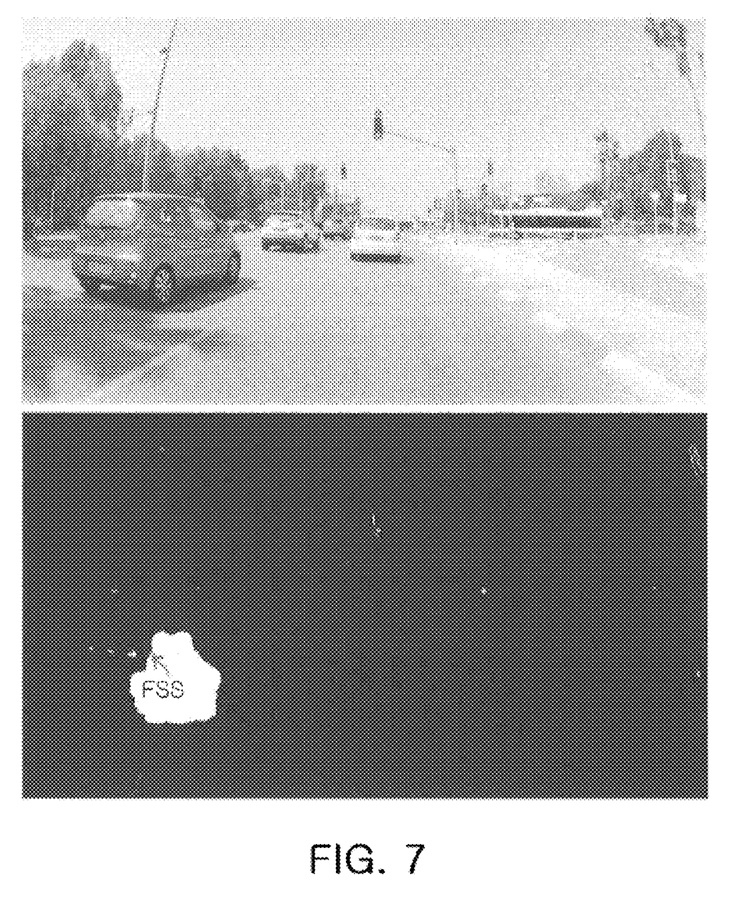
FIG. 7 shows an example of light source object detection results that may be realized with routine of FIG. 6.

FIG. 7 shows an example of light source object detection results that may be realized with routine 600 of FIG. 6. The top image is an image of an original scene that may be captured with camera 200. The scene contains moving vehicles on a road, and various elements such as taillights, traffic lights and reflections off objects may be flickering light source suspects (FSSs). The bottom image shows example results of routine 600, in which the small white regions each represent an FSS of the scene. Thus, for the purpose of flickering light source (FLS) detection, the frame may be divided into white and black regions, where the white regions represent the FSSs of the frame.

Figure 8:
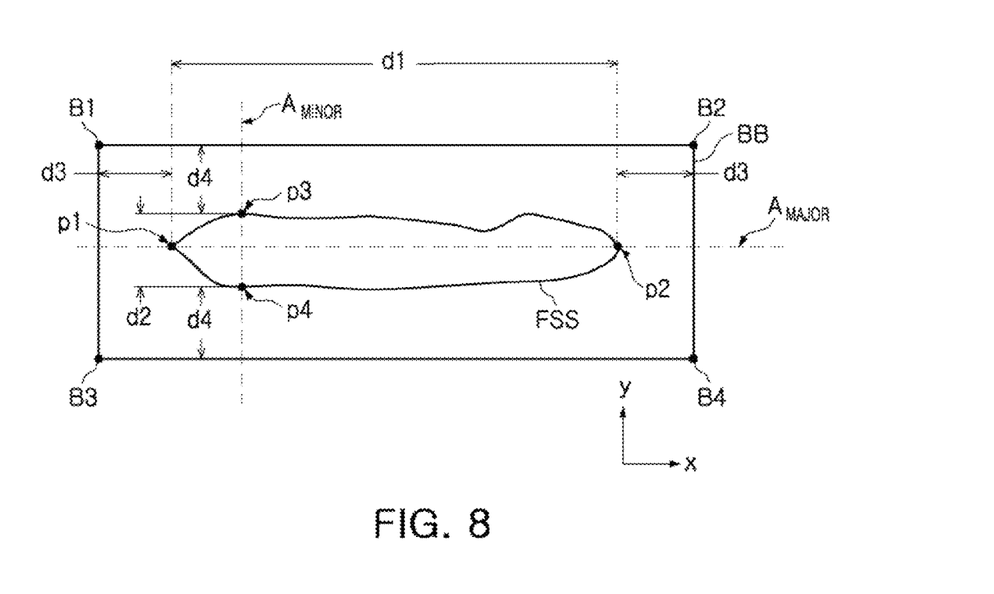
FIG. 8 illustrates an example of how a bounding box may be defined for a flickering light source suspect (FSS).

In operation 640, a bounding box (BB) may be defined for each FSS. FIG. 8 illustrates an example of how a bounding box may be defined for an FSS. In this example, a bounding box BB is rectangular with lengths and widths longer than the longest respective dimensions of the FSS, i.e., in each of orthogonal directions. The example depicts an FSS with a generally oblong profile, but with an irregular shape. Considering the perimeter of the FSS, a maximum distance between two perimeter points may be found, and a straight line between these two points may be aligned with a major axis $A_{MAJOR}$ of the FSS. For example, a maximum distance d1 may exist between points p1 and p2, and a straight line between points p1 and p2 may be aligned with major axis $A_{MAJOR}$. A minor axis $A_{MINOR}$ may then be defined in a direction orthogonal to axis $A_{MAJOR}$. The minor axis $A_{MINOR}$ may be drawn between two perimeter points p3 and p4 that are the furthest apart in the direction orthogonal to $A_{MAJOR}$. The bounding box BB may be defined by corner points B1, B2, B3 and B4 of a rectangular shape. A first "buffer distance" d3 may be set between point p1 and the proximate short side (a line joining B1-B3) of the bounding box. Likewise, a second buffer distance d3 may be defined on the opposite side; a first buffer distance d4 may be set between point p3 and the proximate long side (line between B1 and B2); and a fourth buffer distance d4 may be defined on the opposite side. By setting buffer distances in this manner, tracking of the bounding boxes from frame to frame, and the tracking of the FSSs, may be facilitated. As an example, the long and short sides of the bounding boxes may be at least 10% longer (and in some examples, about 30% longer, in other examples, >30% longer) than the longest FSS distances d1 and d2, respectively, in the orthogonal directions.

In one embodiment, the bounding box BB is formed aligned with the x-y plane of a pixel grid defining the frame. In this case, the major axis $A_{MAJOR}$ is aligned with the x axis and the minor axis $A_{MINOR}$ is aligned with the y axis, or vice versa. In other embodiments, the sides of the bounding box BB are not necessarily aligned with the x-y plane such that the major and minor axes $A_{MAJOR}$, $A_{MINOR}$ may be either aligned or skewed with respect to the x and y axes of the pixel grid. It is also noted that the bounding boxes need not be rectangular. (Herein, the term "rectangular" encompasses also square boxes.)

It is noted here that the bounding box generation as illustrated in FIG. 8 can also be applied to method 300 of FIG. 3, i.e., as part of operation 320. For instance, when an FSS is identified in operation 320, a bounding box (BB) may be generated surrounding the FSS in the same manner just described. The BB may then be tracked from frame to frame to facilitate tracking of the FSS itself, which may change in size, shape and location from one frame to the next.

As discussed above in connection with FIG. 5, the Attention procedure of operation 520 is followed by the Association stage (530) and the Tracking stage (540), where the tracking stage outputs tracked BBs with updated BB positions and sizes. Thereafter, operation 550 performs BB analysis, segmentation and classification on the tracked BBs. This may involve a process of temporal matching of the components of a bounding box in the current frame with the corresponding components from previous frames.

Figure 9:
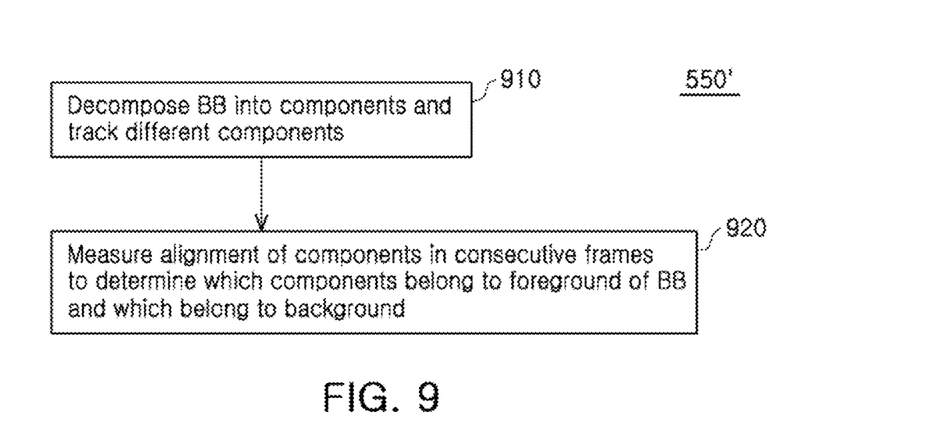
FIG. 9 is a flowchart depicting a set of example operations for bounding box analysis and classification.

FIG. 9 is a flowchart depicting a set of operations, 550', which is an example of operation 550. As mentioned above, for each frame the tracker of operation 540 updates the location and size of each BB. In the operations of FIG. 9, a received BB is first decomposed into different components (910), which are subsequently matched between frames. This allows for a deeper analysis of the components for the purpose of characterizing components that contain sources of light and identification of flickering. (A specific example of operation 910 is described below in connection with FIG. 10, i.e., operations 1010-1050.) With the components decomposed, alignment of the components is measured (920) and they are characterized and matched between consecutive frames to determine which components belong to the "foreground" of the bounding box and which belong to the "background" of the bounding box. Here, the foreground of the BB defines the region of the BB that is under tracking, as opposed to the background, which may contain elements that are constantly changing. For instance, when identifying a component, alignment inside the bounding box may be measured in two or more consecutive frames. If the alignment is consistent over time, it may be concluded that the component belongs to the foreground. If not, it may belong to the background. Thus, the foreground is built from components that have a matched component in the previous frame with a similar alignment. Conversely, the background contains components for which any matched component has a different alignment, or, no matched component exists.

Figure 10:
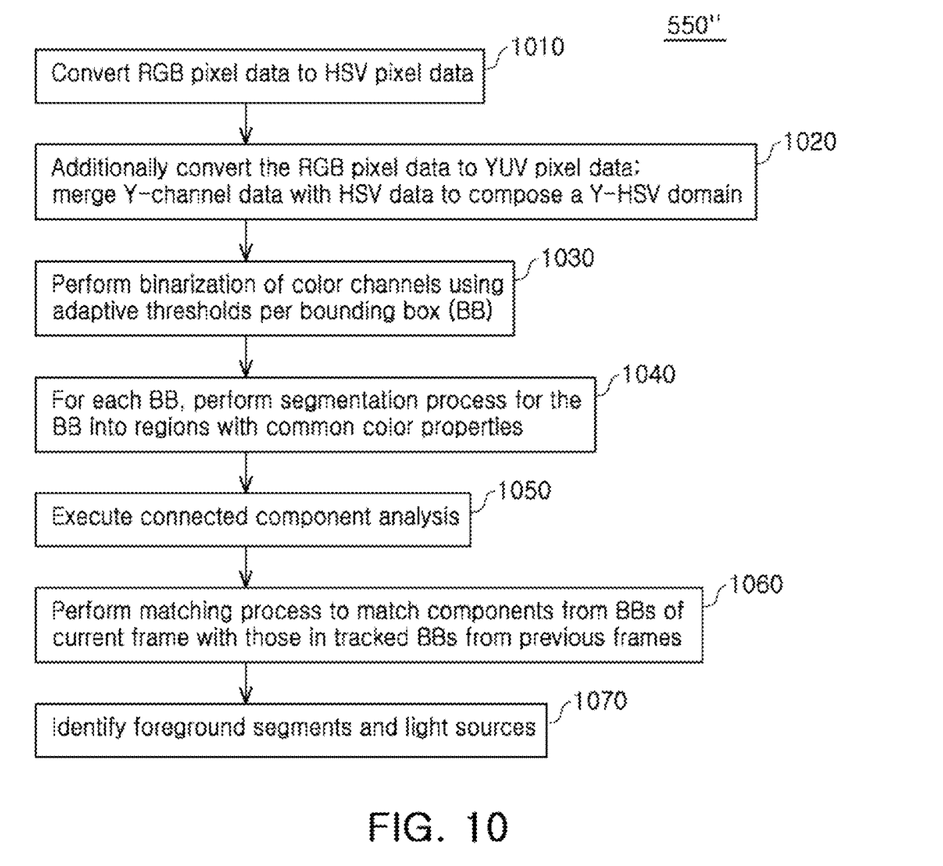
FIG. 10 is a flowchart of another example set of operations for bounding box analysis and classification.

FIG. 10 is a flowchart of a set of operations, 550", for bounding box analysis, which depicts example operations for the set of operations 550' of FIG. 9. In FIG. 10, operations 1010, 1020, 1030, 1040 and 1050 collectively represent an example of operation 910 in FIG. 9. Operations 1060 and 1070 collectively represent an example of operation 920.

At the outset, RGB pixel data of a current frame is converted to HSV pixel data (1010). Additionally, the RGB pixel data is converted to YUV pixel data (1020) and the Y-channel data of the YUV data is merged with the HSV data to compose a Y-HSV domain.

Next, binarization of the color channels is performed (1030) using adaptive thresholds per bounding box, in which binary maps are generated. In the binarization process, for each channel, e.g., H, S, V and Y channels in the Y-HSV domain just formed, a "1" is assigned to pixels that are above a threshold established for that channel, and a "0" is assigned to pixels below the threshold, or vice versa. Here, for each BB, different thresholds may be used for each channel independently from other BBs. For instance, a first region of a scene with a first BB may be part of a bright local environment (due to light sources outside the first BB) while a second region of the scene may be part of a darker local environment, whereby the smart thresholding discussed above may be applied differently to the two bounding boxes.

Thereafter, for each BB, a segmentation process is run (1040) which segments the BB into regions with common color properties. This operation may involve determining intersections of the binary maps (generated in the binarization of the color channels) followed by filtering. A connected component analysis is then executed (1050). This may involve calculating, for each connected component, a descriptor in the Y-HSV domain. The descriptor of a given connected component may contain shape characteristics from each of the channels.

A matching process is then performed (1060) to match components from BBs of the current frame with those in tracked BBs from at least one previous frame. Finding the matched component may be based on: (i) similarity of colors calculated in the Y-HSV domain; (ii) an alignment score, calculated based on the location inside the bounding box; and/or (iii) a shape resemblance rank, calculated based on size and the convex hull of the segment (i.e., its precise geometrical shape).

Thereafter, foreground components in each bounding box are identified (1070). As mentioned earlier, a foreground component of a BB is a component, i.e a segment, that is being tracked. A list of tracked known foreground components and their corresponding segment in the current frame's bounding boxes may be generated. Operation 1070 then checks whether the identified foreground components are light sources and classifies those foreground components as light sources.

It is noted here that the operations of FIGS. 9 and 10 just discussed can also be applied to the method of FIG. 3, i.e., as part of operation 320.

Figure 11:
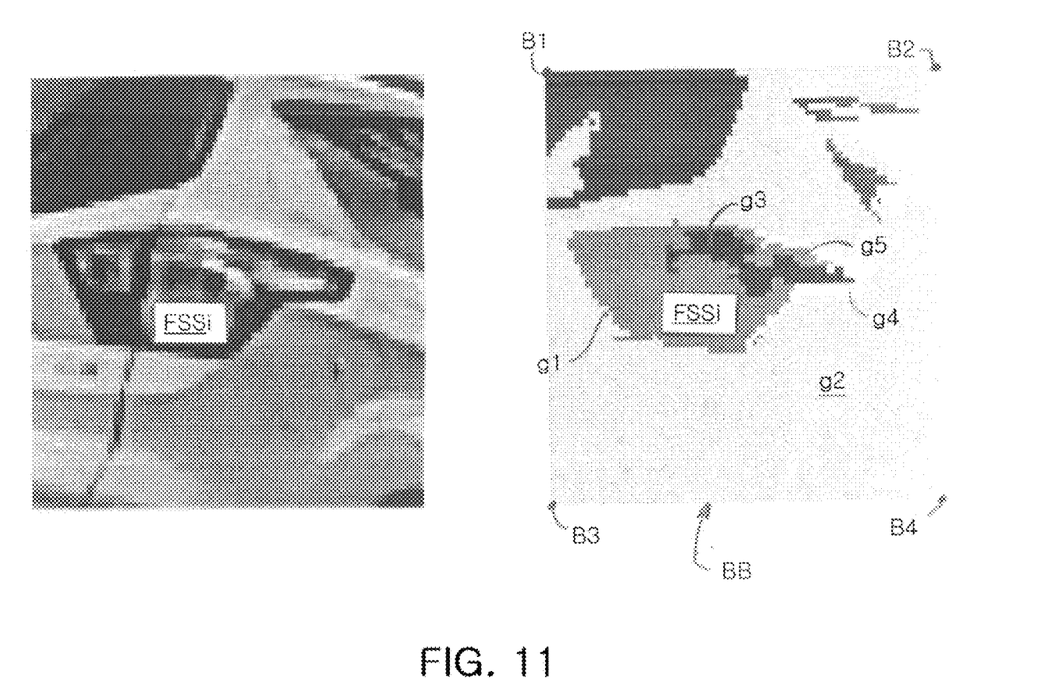
FIG. 11 illustrates an example of a result of the bounding box analysis operations of FIG. 9 or 10.

FIG. 11 illustrates an example of a result of the bounding box analysis operations of FIG. 9 or 10. The left hand image is a portion of an imaged vehicle containing a taillight. A light source FSSi of the taillight is accentuated. The right hand image is an example bounding box BB defined around the light source FSSi by boundary points B1-B4. Light source FSSi represents a foreground segment of the BB classified as a light source suspected to be flickering. Other segments, e.g., g1-g5, may also classified as foreground components; however, a foreground component is not limited to a light source but may be any relatively consistent component (frame to frame) within a BB. For instance, the component g1 may be classified as a light source whereas the segments g2-g5 may be classified as foreground segments that are not light sources. Foreground components may also have different colors from one another.

Figure 12:
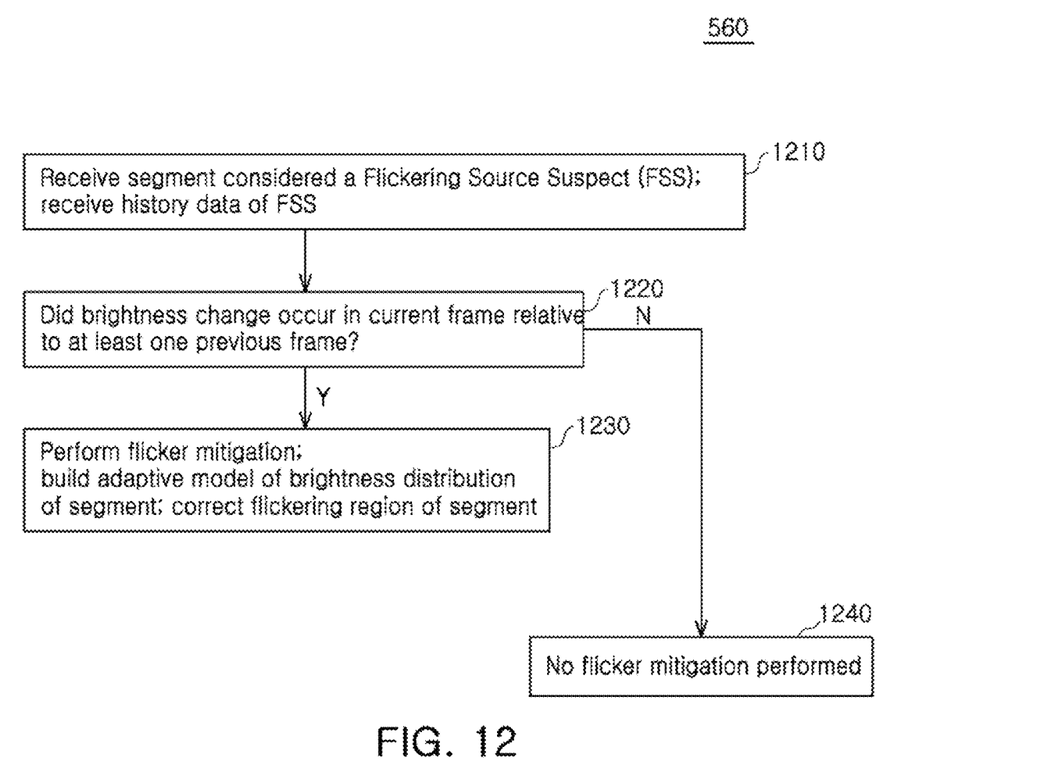
FIG. 12 is a flowchart depicting an example set of operations for light source flicker mitigation.

FIG. 12 is a flowchart depicting an example of operation 560 for light source flicker mitigation. Initially, a segment output from operation 550 is received as an input, where the segment is considered a flickering light source suspect (FSS); and history data regarding this FSS is retrieved from database 590 (1210). This history data may include different types of statistics for the FSS. For instance, statistics from the HSV color space may constitute a majority of this history data. The history data may be data gathered from several consecutive frames, but in some cases, from only a single frame. The history data may be constantly updated according to data from the current frame.

Using the history data, succeeding operations 1220 and 1230 may be performed. Operation 1220 is a decision making operation which determines whether a brightness change occurred in the current frame relative to at least one previous frame. In other words, the process may check to see if there was a distinguished difference in brightness in the current frame compared to the history data in the relevant area of the FSS. If no brightness change occurs for a predetermined number of consecutive frames, the method concludes that no flicker mitigation should be performed for that FSS (operation 1240).

If, however, a considerable brightness change occurred in the current frame (e.g., above a predefined threshold), a flicker mitigation operation is performed (1230) on the FSS to correct the segment accordingly. If, in previous frames where the FSS is bright, the luminance distribution throughout the FSS is relatively uniform, the correction may increase luminance of the FSS in the current frame uniformly. However, in some cases it is unnecessary to correct the entire segment, as only a part of it suffers from the flickering effect. To handle this issue, an adaptive model of the brightness distribution of the segment may be built. The model may be used to generate ON pixel values to replace OFF values. The model may use a mask defined to represent the area of bright pixels in the previous frame. (BB segmentation may also be used to determine light sources.) This may be done using the same smart thresholding scheme discussed above for the Attention stage (operation 520 of FIG. 5). Since segments that are considered light sources may contain objects other than the light sources themselves, the mask is used to mask the non-light-source objects. For instance, in FIG. 11, each of the areas g1, g2, g3, g4, g5, and FSSi be classified as an individual segment, but the area FSSi, contained within the area g1, may be the only portion that is lit. For the lit area, several statistics may be calculated and used to create an overall distribution model of an area of interest, i.e., the above-noted adaptive model (also referred to herein interchangeably as a statistical model). The statistical model may then be used to generate new image data values for pixels in the current frame that are suffering from flickering. Channel-specific distribution models may be calculated in all channels of a selected color space, e.g., HSV color space.

Three examples of such an adaptive model will now be described, but other suitable models may be available. A first adaptive model example defines each of H, S and V channels of HSV color space as being independent and identically distributed (iid) random variables and defines each of the H, S and V channels as being distributed according to a predefined type of distribution. Data from the previous frame's masked area may then be used to evaluate desired or necessary parameters for the chosen distribution model. In this case, the S and V channels may be generated from a normal distribution. However, a "regular" distribution for H may not be assumed as it has a periodic nature (described in degrees in HSV space, similar to θ in polar coordinates). Therefore, the von Mises distribution may be used for the H channel. The von Mises distribution is a continuous probability distribution on a circle. The von Mises probability density function for the angle x is given by:

$$f(x \mid \mu, \kappa) = \frac{e^{\kappa \cos(x-\mu)}}{2\pi I_0(\kappa)},$$

where $I_0(\kappa)$ is the modified Bessel function of order 0. The parameters $\mu$ and $1/\kappa$ are analogous to the mean and the variance ($\sigma^2$), respectively, of the normal distribution. The von Mises probability density function gives values in the interval $[-\pi, \pi]$ and therefore the H channel should be normalized to this interval when evaluating the values of $\mu$ and $\kappa$.

A second example of the adaptive model uses the same distributions as in the first example, but assumes that the S and V channels are not iid. Therefore, a multivariate normal distribution model may be used, which involves calculating the covariance matrix Σ. The von Mises model may still be used for the H channel in the second example.

A third example of the adaptive model may use an arbitrary distribution for each of the H, S and V channels. This may involve calculating a joint three dimensional (3D) histogram from data in the previous frame in the masked area. Samples may then be generated using a method similar to the Inverse transform sampling for a 1D histogram, but applied to three dimensions.

Operation 1220 also distinguishes intentional flickering of an FSS, i.e. blinking, such as for pedestrian lights or vehicle signaling lights by detecting that such intentional flickering has a lower flickering frequency than an inherent flickering frequency such as in an LED. For example, operation 1220 may detect one of more flickering frequencies of an FSS and refrain from correcting pixels of that FSS if the only flickering frequency detected is a frequency below a predetermined threshold.

Embodiments of the inventive concept such as those described above may exhibit certain advantages over conventional techniques for addressing flickering light sources. As an example, LED flicker mitigation is a common problem in the automotive industry, especially with current advances in the areas of ADAS, IVI and autonomous driving. Most conventional methods addressing the problem try to solve it by either changing the sampling scheme of the sensor by modifying the pixels or by adapting the exposure strategy the sensor uses. On the other hand, the inventive concept described herein corrects LED flicker mitigation using an ISP system. Advantages exhibited by various embodiments of the inventive concept may include one or more of the following:

(i). Compatibility—as the flicker mitigation system described herein operates on the output image of the sensor, the system can be used with a wide variety of sensors (e.g., Bayer, RCCC (a sensor with one red filter and three clear filters), RGBW (an RGB filter including a "white" filter element), etc.). This allows a high degree of flexibility when deciding what type of sensor to deploy in the camera.

(ii). Independency—embodiments make decisions per bounding box independently, regardless of other areas in the image. First, this enables handling of several different LED sources with different flickering frequencies in the scene. Further, this allows for only local changes in the output image without affecting other areas in the image. This also results in elimination or minimization of a global effect (such as over exposure) caused by a local phenomenon.

(iii). Wide Dynamic Range free—the method does not interfere with a WDR decision, thus enabling a high dynamic range for the output image.

(iv). Tunable decision level—the working point of the algorithms in various embodiments may be adjusted using a set of simple control parameters. Using this approach enables handling of different conditions (e.g., day/night) and adjustment to different sensors if required.

(v). Robustness—ability to successfully track a range of flickering objects.

(vi). Speed—correction may occur in real time, for example within one frame or within several frames at a typical frame rate (e.g., 30 f/s).

Exemplary embodiments of the inventive concept have been described herein with reference to signal arrows, block diagrams (e.g., the flowcharts for methods 300, 500, 520, 550', 550" and 1200) and algorithmic expressions. Each block of the block diagrams (e.g., any of operations 310-350, 510-580, 610-640, 910-920, 1010-1070, 1210-1240) and combinations of blocks in the block diagrams, and operations according to the algorithmic expressions can be implemented by hardware (e.g., processing circuitry of ISP 220 in cooperation with memory 230) accompanied by computer program instructions. Such computer program instructions may be stored in a non-transitory computer readable medium (e.g. memory 230) that can direct a computer, other programmable data processing apparatus, or other devices to function in a particular manner, such that the instructions stored in the computer readable medium produce an article of manufacture including instructions which implement the function/act specified in the block diagram.

The term "processor" as used herein is intended to include any processing device, such as, for example, one that includes a central processing unit (CPU) and/or other processing circuitry (e.g., digital signal processor (DSP), microprocessor, etc.). Moreover, a "processor" includes computational hardware and may refer to a multi-core processor that contains multiple processing cores in a computing device. Various elements associated with a processing device may be shared by other processing devices.

The above-described methods according to the present technology can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered using such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the inventive concept described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. An image processing method comprising:
   receiving from an image sensor a sequence of input frames representing a scene;
   identifying a light source represented within the input frames, and tracking the identified light source between consecutive input frames;
   identifying flickering of the light source by detecting frame to frame color characteristic variation of a region representing the light source; and
   generating a sequence of output frames corresponding to the input frames, with the flickering removed by selectively modifying image data of pixels within the region.

2. The image processing method of claim 1, wherein said detecting frame to frame color characteristic variation comprises identifying a frame to frame change in at least one color space volume location of the light source, wherein the change satisfies at least one predefined criterion.

3. The image processing method of claim 2, wherein the at least one color space volume location comprises a volume location in Hue Saturation Value (HSV) color space.

4. The image processing method of claim 3, wherein the HSV color space is defined with H, S and V channels, and the flickering of the light source is identified by identifying a change in density of a histogram of the value (V) channel that satisfies the at least one predefined criterion.

5. The image processing method of claim 1, wherein said identifying a light source comprises:
   detecting an object within each of the input frames; and
   identifying the object as a light source by determining that pixels representing the object are brighter than other image pixels of the input frames through use of adaptive thresholding.

6. The image processing method of claim 1, wherein said identifying a light source and tracking the identified light source comprises:
   defining a bounding box surrounding a flickering light source suspect (FSS); and
   tracking the light source between consecutive frames by tracking the bounding box between consecutive frames.

7. The image processing method of claim 6, wherein the bounding box is defined as a rectangular box having a length longer than a longest distance between perimeter points of the FSS, aligned with a major axis of the FSS, by at least 10%, and having a width longer by at least 10% than a longest distance between perimeter points of the FSS in a direction orthogonal to the major axis.

8. The image processing method of claim 6, wherein the bounding box is defined as a rectangular box having a length and a width, the length being longer than a longest distance between perimeter points of the FSS in an x direction of a pixel grid defining the input frames by at least 10%, and the width being longer than a longest distance between perimeter points of the FSS in a y direction of the pixel grid by at least 10%.

9. The image processing method of claim 6, further comprising segmenting components of the bounding box.

10. The image processing method of claim 9, further co p sing:
    tracking the segmented components of the bounding box between consecutive input frames.

11. An apparatus comprising:
    a camera including:
    an image sensor configured to capture images of a scene and provide input frames representing the same;
    an image signal processor configured to execute instructions to:
    receive from the image sensor a sequence of the input frames;
    identify a light source represented within the input frames, and track the identified light source between consecutive input frames;
    identify flickering of the light source by detecting frame to frame color characteristic variation of a region representing the light source; and
    generate a sequence of output frames corresponding to the input frames, with the flickering removed by selectively modifying image data of pixels within the region.

12. The apparatus of claim 11, further comprising a display and a response system for generating a response to the sequence of output frames.

13. The apparatus of claim 12, wherein the apparatus is a vehicle.

14. The apparatus of claim 11, wherein said identifying a light source and tracking the identified light source comprises:
    defining a bounding box surrounding a flickering light source suspect (FSS); and
    tracking the light source between consecutive frames by tracking the bounding box between consecutive frames.

15. The apparatus of claim 14, wherein the bounding box is defined as a rectangular box having a length and a width, the length being longer than a longest distance between perimeter points of the FSS in an x direction of a pixel grid defining the input frames by at least 10%, and the width being longer than a longest distance between perimeter points of the FSS in a y direction of the pixel grid by at least 10%.

* * * * *